(12) United States Patent
Lu et al.

(10) Patent No.: US 11,552,324 B2
(45) Date of Patent: Jan. 10, 2023

(54) HIGH EFFICIENCY ZINC-IODINE ADSORPTION-AIDED FLOW BATTERY WITH A LOW COST MEMBRANE

(71) Applicant: The Chinese University of Hong Kong, Hong Kong (CN)

(72) Inventors: Yi-Chun Lu, Hong Kong (CN); Zengyue Wang, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 299 days.

(21) Appl. No.: 17/017,885

(22) Filed: Sep. 11, 2020

(65) Prior Publication Data

US 2022/0085401 A1     Mar. 17, 2022

(51) Int. Cl.
| | |
|---|---|
| *H01M 8/18* | (2006.01) |
| *H01M 4/42* | (2006.01) |
| *H01M 4/137* | (2010.01) |
| *H01M 4/1397* | (2010.01) |
| *H01M 8/04082* | (2016.01) |
| *H01M 8/0202* | (2016.01) |
| *B01J 20/20* | (2006.01) |
| *H01M 8/1004* | (2016.01) |

(52) U.S. Cl.
CPC ............ *H01M 8/188* (2013.01); *B01J 20/20* (2013.01); *H01M 4/137* (2013.01); *H01M 4/1397* (2013.01); *H01M 4/42* (2013.01); *H01M 8/0202* (2013.01); *H01M 8/04216* (2013.01); *H01M 8/1004* (2013.01); *H01M 2300/0088* (2013.01)

(58) Field of Classification Search
CPC .... H01M 8/188; H01M 4/137; H01M 4/1397; H01M 4/42; H01M 8/0202; H01M 8/04216; H01M 8/1004; H01M 2300/0088; B01J 20/20
See application file for complete search history.

(56) References Cited

U.S. PATENT DOCUMENTS

| | | | |
|---|---|---|---|
| 2019/0103600 A1* | 4/2019 | Greer | H01G 11/84 |
| 2021/0111424 A1* | 4/2021 | Park | H01M 8/1051 |

OTHER PUBLICATIONS

Li, B. et al., "Ambipolar zinc-polyiodide electrolyte for a high-energy density aqueous redox flow battery", Nature Communications, 2015, pp. 1-8, Macmillan Publishers Limited.

(Continued)

*Primary Examiner* — Stewart A Fraser
(74) *Attorney, Agent, or Firm* — Saliwanchik, Lloyd & Eisenschenk

(57) ABSTRACT

A flow battery system and methods are provided for eliminating crossover issues of active materials in redox flow batteries. A solid adsorbent with large specific surface area is disposed in an electrolyte of at least one half-cell, in contact with the electrolyte. During a charging process, the active material in a charged state is captured and stored on surfaces of the adsorbent, so that concentrations of the active material in the electrolyte in the charged state is reduced and the crossover is inhibited. During a discharging process, the active material is desorbed from the adsorbent to the electrolyte and pumped into the stack for reaction. The flow battery stack can have a microporous membrane separator. The electrolyte of the flow battery includes zinc iodide as active material and polyethylene glycol (PEG) as an additive.

20 Claims, 10 Drawing Sheets

(56) References Cited

OTHER PUBLICATIONS

Xie, C. et al., "A Long Cycle Life, Self-Healing Zinc-Iodine Flow Battery with High Power Density", Communications, *Angewandte Chemie International Edition*, 2018, 57:1-7, Wiley-VCH Verlag GmbH & Co. KGaA, Weinheim.

Weng, G.M. et al., "Unlocking the capacity of iodide for high-energy-density zinc/polyiodide and lithium/polyiodide redox flow batteries", Energy & Environmental Science, 2017, 10:735-741, The Royal Society of Chemistry.

Pan, H. et al., "Controlling Solid-Liquid Conversion Reactions for a Highly Reversible Aqueous Zinc-Iodine Battery", ACS Energy Letters, 2017, 2:2674-2680, American Chemical Society.

Xie, C. et al., "Highly stable zinc-iodine single flow batteries with super high energy density for stationary energy storage", Energy & Environmental Science, 2019, 12:1834-1839, The Royal Society of Chemistry.

Ballesteros, J.C. et al., "Zinc electrodeposition in the presence of polyethylene glycol 20000", Electrochimica Acta, 2007, 52:3686-3696, 2006 Elsevier Ltd.

Kim, J.W. et al., "Effects of Organic Additives on Zinc Electrodeposition at Iron Electrodes Studied by EQCM and in Situ STM", *Langmuir*, 2004, 20:459-466, American Chemical Society.

Sun, K.E.K. et al., "Suppression of Dendrite Formation and Corrosion on Zinc Anode of Secondary Aqueous Batteries", ACS Applied Materials & Interfaces, 2017, 9:9681-9687, American Chemical Society.

Darling, R.M. et al., "Pathways to low-cost electrochemical energy storage: a comparison of aqueous and nonaqueous flow batteries", Energy & Environmental Science, 2014, 7:3459-3477, The Royal Society of Chemistry.

Fan, Y. et al., "Economic analysis of flow battery energy storage for wind farm application", Energy Storage Science and Technology, May 2020, 9(3):725-729, along with an English Abstract.

\* cited by examiner

HIGH EFFICIENCY ZINC-IODINE ADSORPTION-AIDED FLOW BATTERY WITH A LOW COST MEMBRANE

BACKGROUND OF THE INVENTION

The increasing concern on climate changes and air pollution accelerates the transformation of energy systems to be renewable. Compared to coal plants, nature clean power (solar or wind) has disadvantages of intermittent supply and uncontrollable instant power. Moreover, the supply period of nature power may not satisfy the requirements of users. As a result, energy storage plays a critical role in the renewable energy systems. As one of the most competitive candidates for large-scale energy storage, flow batteries (FBs) offer unique advantages of high efficiency, low cost, scalability and rapid response for grid energy storage. A flow battery comprises two electrolytes tanks—an anolyte tank and a catholyte tank for energy storage, a stack for power conversion, and two pumps to circulate the two electrolytes between the tanks and the stack. The stack includes an anode in contact with the anolyte, a cathode in contact with the catholyte, and a separator disposed between the anode and the cathode.

One major challenge for flow battery is the issue of crossover. Separators used in flow battery generally include an ion-exchange membrane, conducting charge-carrier ions and preventing crossover of active species. However, active species in anolyte/catholyte may still slowly diffuse through the separators to the opposite side, causing self-discharge and reducing the coulombic efficiency of the battery. In some flow battery systems, the active materials may have side reactions with the opposite electrode or the electrolyte, so that the crossover issues of active materials leads to irreversible capacity loss and eventually battery failure. Previously, many researchers investigated in solving the crossover issue by improving designs of the separators, including functionalization of membrane surfaces, pore-size control of nanoporous membranes, and coating on membrane surfaces. However, there is a dilemma between conductivity of the membrane and selectivity of the membrane. Solving crossover issue with high selectivity separator may lead to high polarization of flow battery, which reduces energy efficiency. Moreover, high cost of high-performance ion-exchange membranes may work against the economic feasibility of the flow batteries.

Zinc-iodine (Zn—I) flow batteries offer an advantage of symmetric electrolyte by utilizing both anion and cation of active materials to avoid crossover contamination. As a result, the Zn—I flow batteries may potentially use microporous membranes for separating anolyte and catholyte. Compared to the conventional cation-exchange membranes used in the flow batteries such as Nafion, the porous membranes provide benefits including significantly lower cost (about 1/5-1/20 of the cost of the Nafion), higher ionic conductivities, higher mechanical strength and robustness against Zn dendrite penetrations. However, due to lack of selectivity, crossover of triiodide ($I_3$—) or iodine-bromide ($I_2Br$—) reduces coulombic efficiency of the Zn—I flow batteries and aggravates the dendrite problem. Suppression of iodine-crossover is a great challenge for the utilization of low-cost porous membrane separators in the Zn—I flow batteries.

The first Zn-ion (ZIB) battery proposed by B. Li et al[1]. had a high energy density of 167 Wh $L^{-1}$ for catholyte, which was achieved by a 5M $ZnI_2$ electrolyte and a Nafion cation exchange membrane[1]. During the charging processes of the ZIB battery, the iodide (I—) was first charged to form iodine molecule ($I_2$) and the $I_2$ was then coupled with a I— to form soluble triiodide $I_3$—, as indicated by Equations (1)-(2). Therefore, the utilization of iodine was limited to 2/3 of the full capacity, and the current density was limited to a range of 5-20 mA $cm^{-2}$ due to ohmic resistance of the Nafion separator.

Equation (1)

Equation (2)

C. Xie et al proposed a flow battery using a carbon-coated porous separator instead of the Nafion[2], improving the operation current density to a range of 80-180 mA $cm^{-2}$. However, the crossover of $I_3$— reduced coulombic efficiency (CE) at a low current density (90% CE at 60 mA $cm^{-2}$).[2]

To fully utilize the capacity of iodine, a low-cost complex agent was reported to be added to form soluble complex with iodine. GM. Weng and coworkers used bromide additive to form iodine-bromide ($I_2Br$—) instead of $I_3$— as indicated by Equation (3), achieving a system energy density of 101 Wh $L^{-1}$ by fully utilizing the iodine element[3].

Equation (3)

Another way explored to improve the iodine utilization was by using precipitation reactions of I—/$I_2$. X. Li et al. applied activated carbon (AC) as electrodes of the iodine-based batteries for adsorbing free iodine in the electrolyte, thereby improving reaction kinetics and inhibiting the crossover problem[4]. However, this method had a limited current density (~2 mA $cm^{-2}$) and areal capacity (<3 mAh $cm^{-2}$), making the method more suitable for mobile electronics rather than for large-scale energy storage applications.

The formation of $I_3$— in the catholyte is a reversible process. At high state-of-charge (SOC), the concentration of I— is low and the reaction tends to happen in the reversed direction, which may cause iodine precipitation that blocks the pipeline and leads to capacity loss. One possible way to solve the blocking problem is by adoption of single-flow battery architecture demonstrated by C. Xie and coworkers[5]. This architecture used non-flowing catholyte and iodine deposited on surfaces of the carbon electrode, achieving a high energy density of 200 Wh/$L^{-1}$. However, the benefit came with a cost of sacrificing the advantage of decoupled energy and power in the flow battery, limiting the discharging time (<1 h). Moreover, the crossover issue was very serious when a porous polyolefin separator (CE 74% at 20 mA $cm^{-2}$) was used, which may be improved by using a Nafion-coated separator (CE 92% at 20 mA $cm^{-2}$).

BRIEF SUMMARY OF THE INVENTION

Embodiments of the subject invention pertain to a flow battery system and methods for eliminating crossover issues of active materials in redox flow batteries. The adsorbent in electrolyte tank can improve coulombic efficiency of the flow battery system and methods. The flow battery system can comprise a stack, two tanks for anolyte and catholyte, respectively, and two pumps circulating electrolytes between the stack and the tanks. The stack comprises an anode configured to be in contact with the anolyte, a cathode configured to be in contact with the catholyte, and a separator interposed between anode and cathode. Solid adsorbents with a high specific surface area, for example, a specific surface area greater than 20 m$^2$ g$^{-1}$, are included in the flow battery system, adsorbing charged active material onto their surfaces. The adsorbent(s) is disposed in one or both tanks, in contact with liquid electrolyte(s). Outlet(s) of the electrolyte tank(s) may have a filter structure to keep the solid adsorbents within the tank(s). During a charging process, the charged active material is adsorbed and stored by the adsorbent in the electrolyte tank, so that the concentration of the charged active material in electrolyte is reduced, and the crossover issue is limited. During a discharging process, the concentration of the charged active material in electrolyte is reduced, thereby the active material stored on the surfaces of the adsorbent is desorbed into the electrolyte and then pumped into the stack to discharge.

According to an embodiment of the invention, a flow battery system can comprise a same anolyte and catholyte composition of zinc iodide ($ZnI_2$) and supporting cations including $Li^+$, $Na^+$, $K^+$ and/or $NH_4^+$, an adsorbent comprising activated carbon (AC) disposed to be in contact with the catholyte, an anode configured to be in contact with the anolyte, a cathode configured to be in contact with the catholyte; and a separator interposed between the anode and the cathode. The catholyte comprises triiodide ($I_3-$) or iodine-bromide ($I_2Br-$), during a charging process of the flow battery system, the triiodide ($I_3-$) or iodine-bromide ($I_2Br-$) is adsorbed and stored by the activated carbon in a form of solid $I_2$; and during a discharging process of the flow battery system, the solid $I_2$ is dissolved into the catholyte when a concentration of the $I_3^-/I_2Br^-$ decreases. During the charging processes, the $I_3^-/I_2Br^-$ formed is circulated from the cathode to the catholyte and adsorbed by the AC. During the discharging processes, when a concentration of the $I_2Br^-$ decreases, the $I_2$ on surfaces of the AC is dissolved by the bromide in the catholyte. The anolyte and the catholyte have a same composition of zinc, bromide and iodide salt. Moreover, the separator comprises a porous membrane. The separator is configured to allow migration of $I^-$ from the anolyte to the catholyte such that capacity of the flow battery system is increased. The catholyte or anolyte comprises polyethylene glycol (PEG) as an electrolyte additive, which forms complex with $I_3^-/I_2Br^-$ and deposits on surfaces of the membrane so that the crossover is further suppressed. The synergistic effect of AC and PEG achieved high utilization of iodine of approximately 100% and a high coulombic efficiency of about 95%.

BRIEF DESCRIPTION OF THE DRAWINGS

FIGS. 3A-3C show comparisons of performance of K—Zn—I flow battery with activated carbon (AC) in a container tank and performance of K—Zn—I flow battery without activated carbon (AC) in the tank, wherein FIG. 3A shows the first two cycles of the 2M KI battery with and without AC at current density of 20 mA cm$^{-2}$, sample for UV-vis spectrum test being taken at end of the first charging; wherein FIG. 3B shows the first two cycles of the K-Zn—I battery with the PEG, with and without AC in tank. Applied current density is 20 mA cm$^{-2}$, and sample for UV-vis spectrum test is taken at end of the first charging; wherein FIG. 3C shows UV-vis adsorption spectrum of fully charged electrolytes of the two cells, adsorption peaks of triiodide are marked at wavelength of 288 and 350 nm, while the peak of iodine being marked at 460 nm.

FIG. 4A shows the schematic of a conventional Zn—I flow battery with porous membrane. FIG. 4B shows the schematic of a Zn—I flow battery with AC in tank, according to an embodiment of the subject invention. FIG. 4C shows the schematic of a Zn—I flow battery with AC in tank and PEG additive, according to an embodiment of the subject invention.

FIGS. 5A-5D show performance of the $NH_4$—Zn—I flow battery with the AC in the tank and polyethylene glycol (PEG) additive, wherein FIG. 5A shows charge-discharge voltage plot diagrams of 2M $NH_4I$ cell with AC weighting 0%, 45% and 90% of the iodine element at current density of 20 mA cm$^{-2}$, respectively; wherein FIG. 5B shows a charge-discharge plot diagram of 2M $NH_4I$ cell with AC weighting 90% of the iodine element at current density of 20-80 mA cm$^{-2}$; wherein FIG. 5C shows rate test results of 2M $NH_4I$ cell at current density of 20-80 mA cm$^{-2}$; and wherein FIG. 5D shows polarization curves of the 2M $NH_4I$ cell, according to an embodiment of the subject invention.

DETAILED DISCLOSURE OF THE INVENTION

Embodiments of the subject invention provide novel and advantageous flow battery systems and methods for eliminating crossover of active materials in redox flow batteries. Crossover refers to transportation of redox active species across ion exchange membrane leading to self-discharge, irreversible reaction, low coulombic efficiency, and capacity decay.

Figure 1:
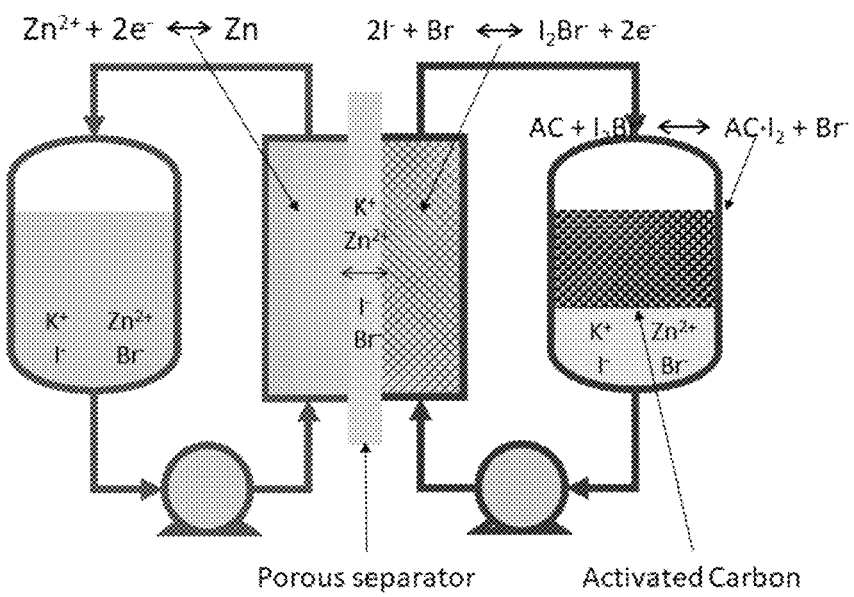
FIG. 1 is a schematic representation of a Zn—I adsorption-aided flow battery, according to an embodiment of the subject invention.

This invention solves the crossover problem by having adsorbents disposed in the electrolyte tank in contact with the electrolyte, as shown in FIG. 1. The adsorbents can be disposed in one or both electrolyte tanks. During a charging process, the adsorbents with high specific surface areas, for example, a specific surface area greater than 20 $m^2$ $g^{-1}$, can adsorb charged active material in the electrolyte during the charging, so that the concentration of charged active material is reduced and the crossover is inhibited. During a discharging process, the concentration of charged active material in electrolyte is reduced, and the charged active material stored on surfaces of the adsorbents is desorbed to the electrolyte and then circulated to the stack for reactions.

The adsorbents configurations for controlling the crossover issue can be applied to many different types of flow battery systems. The adsorbent can be either activated carbon, silica gel, zeolite, metal sulfide, polymer matrix, or metal-organic frameworks, and the adsorbing active materials can include halogen, sulfide/polysulfide, transition metal ions, and organic molecules. The form of adsorbent can be either a particle, a pellet, fabric or porous bulk. The electrolyte tank may have a filter structure to keep all the adsorbents in the electrolyte tank without being flushed into the external tubes and the stack.

Utilization of low-cost high-conductivity separators facilitates controlling of crossover. In some embodiments, the anolyte and the catholyte may have a same composition. With adsorbents in tank, a high coulombic efficiency can be achieved with porous non-selective separator, providing advantages of high conductivity and low cost.

In one embodiment, a zinc-iodine adsorption-aided flow battery (ZIAB) system comprises activated carbon (AC) as adsorbents in a container and a low-cost porous separator. The $I_3^-/I_2Br^-$ is catholyte of the ZIAB system is adsorbed and stored by the activated carbon in a form of solid $I_2$ in the container during the charging processes of the ZIAB system, while the solid $I_2$ is dissolved into the catholyte when a concentration of $I_3^-/I_2Br^-$ decreases during the discharging processes.

As a result, the concentration of the $I_3^-/I_2Br^-$ in catholyte is reduced at high SOC, inhibiting the crossover issue. Since the iodine is stored as solid $I_2$ in the container, utilizations of the iodine as high as almost 100% in catholyte can be realized. Further, a high coulombic efficiency of 95% can be achieved with the AC in the container when polyethylene glycol (PEG) is used as an electrolyte additive.

Moreover, the activated carbon limits precipitation reactions of iodine in the container, inhibiting the pipe-blocking problem caused by the solid iodine. Thus, the subject invention offers advantages of decoupled energy and power for a flow battery, leading to low-cost, scalable, and reliable energy storage applications.

When the term "about" is used herein, in conjunction with a numerical value, it is understood that the value can be in a range of 90% of the value to 110% of the value, i.e. the value can be +/−10% of the stated value. For example, "about 1 kg" means from 0.90 kg to 1.1 kg.

Figure 2A:
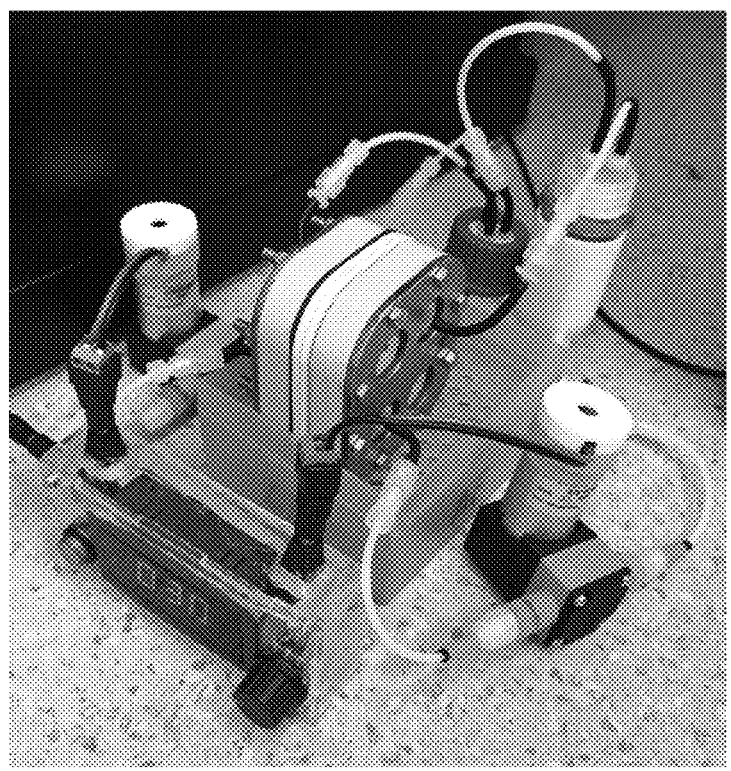
FIG. 2A shows an image of a prototype of the flow battery set in testing, according to an embodiment of the subject invention.

FIG. 1 shows a Zn—I adsorption-aided flow battery system and FIG. 2A shows a lab-scale prototype of the flow battery system for testing.

In one embodiment, the anolyte and catholyte of the flow battery system have a composition of zinc, bromide and iodide salt as shown in Table 1. The AC particles are immersed in a container such as a tank containing the catholyte and flowed through by the catholyte. A filter may be installed at the outlet of the catholyte container, inhibiting carbon particles from getting into the pipelines of the flow battery system.

TABLE 1

Composition of Electrolytes

| Sample | Salt A | Salt B | Activated carbon | PEG |
|---|---|---|---|---|
| K-C0 | $ZnBr_2$ 1M | KI 2M | 0 | 0 |
| K-C90 | $ZnBr_2$ 1M | KI 2M | 228 g/L | 0 |
| K-P-C0 | $ZnBr_2$ 1M | KI 2M | 0 | 1% vol |
| K-C90 | $ZnBr_2$ 1M | KI 2M | 228 g/L | 1% vol |
| A-P-C0 | $ZnI_2$ 1M | $NH_4Br$ 2M | 0 | 1% vol |
| A-P-C45 | $ZnI_2$ 1M | $NH_4Br$ 2M | 114 g/L | 1% vol |
| A-P-C90 | $ZnI_2$ 1M | $NH_4Br$ 2M | 228 g/L | 1% vol |

During the charging processes of the Zn—I adsorption-aided flow battery system, the $I_3^-/I_2Br^-$ formed is carried from the cathode to the catholyte container and adsorbed by the AC as shown in Equation (4), thereby limiting a concentration of the $I_2Br^-$ in the catholyte and inhibiting the crossover by diffusion.

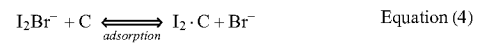

$$I_2Br^- + C \underset{adsorption}{\rightleftharpoons} I_2 \cdot C + Br^- \quad \text{Equation (4)}$$

During the discharging processes of the Zn—I adsorption-aided flow battery system, when the concentration of $I_2Br^-$ decreases, the $I_2$ on surfaces of the AC are dissolved by the bromide in the catholyte, flowing into the stack of the Zn—I adsorption-aided flow battery system for the discharge processes.

Moreover, with the adsorption-based flow battery system and methods, a high coulombic efficiency can be achieved, and a low-cost, non-selective porous separator can be employed. Furthermore, the issue of $I_2$ leakage to the environment can be inhabited. As the porous separator allows migration of $I^-$ from the anolyte to the catholyte of the Zn—I adsorption-aided flow battery system, the in the anolyte leads to an increase of the capacity of the flow battery system.

Figure 2B:
FIG. 2B shows an image of a prototype of a catholyte container with filter structure, containing activated carbon, according to an embodiment of the subject invention.

In one embodiment, the anolyte and/or catholyte container contains a filter structure as shown in FIG. 2B, to keep the plurality of solid adsorbents in the electrolyte container. without flowing into tubes, pumps and flow channels and causing blocking problem. The electrolyte flows through the plurality of solid adsorbents in the electrolyte container for the adsorption/desorption reaction.

Figure 2C:
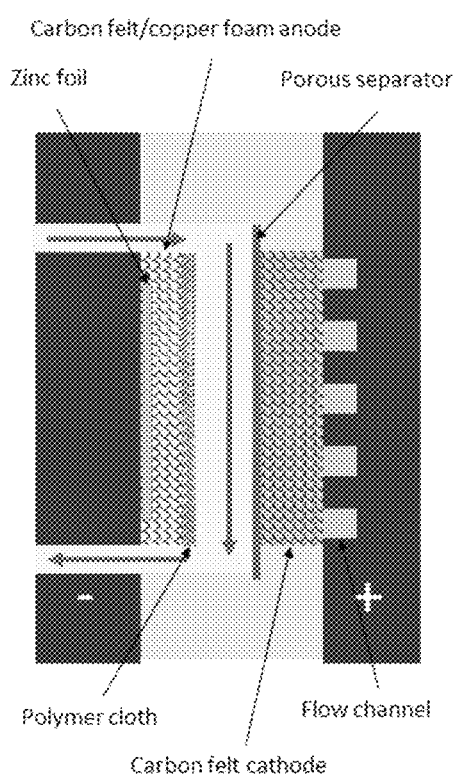
FIG. 2C is a schematic representation of the flow stack internal structure, according to an embodiment of the subject invention.

Now referring to FIG. 2C, in one embodiment, the flow battery stack can comprise a graphite felt electrode, a copper foam electrode, a graphite current collector with a serpentine flow channel, and a hydrophilic polytetrafluoroethylene (PTFE) microporous separator.

To illustrate the effects of the adsorption employed by the subject invention, performance of one Zn—I adsorption-aided flow battery system with the AC in the container is compared with performance of one Zn—I adsorption-aided flow battery system without the AC in the container. Each side of the two battery systems contains 15 mL 2M KI with 1M $ZnBr_2$ electrolyte, and the AC weights 80% of the iodine element.

Figure 3A:
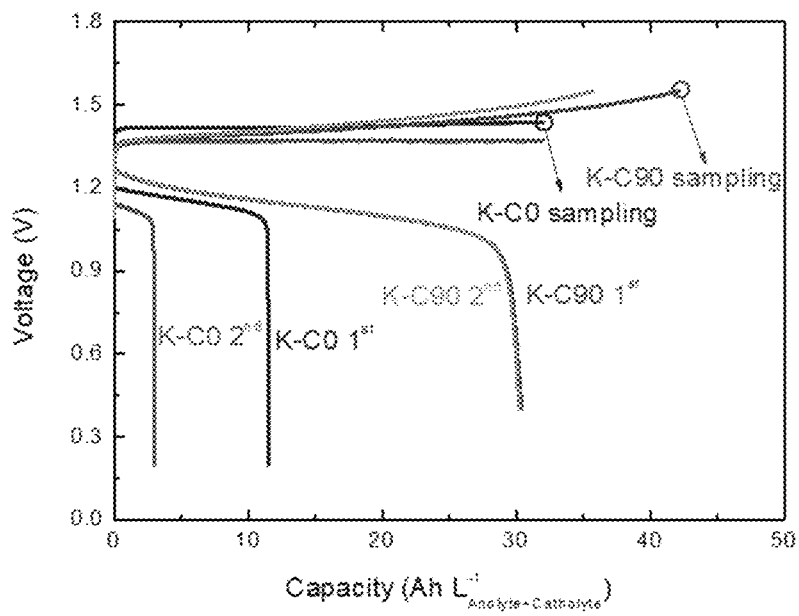
Figure 3B:
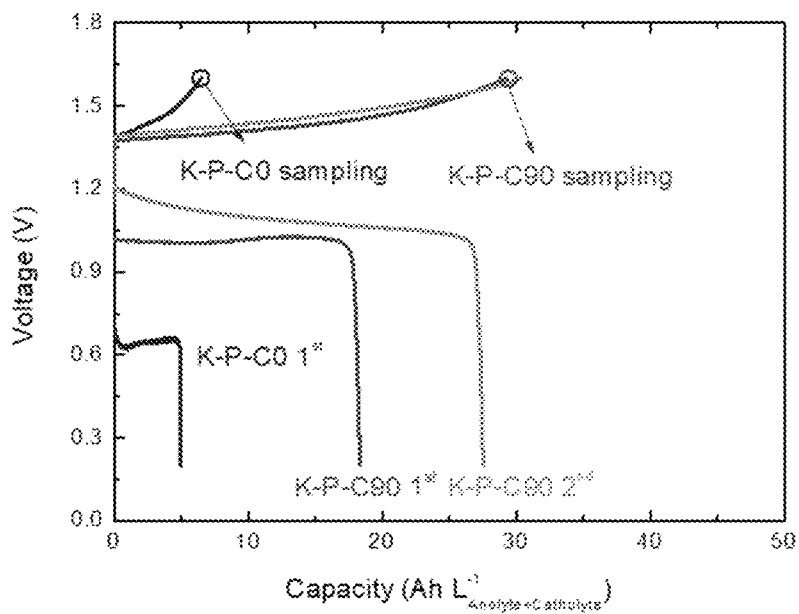

FIGS. 3A-3B illustrate the results of the comparisons of the battery systems with and without AC adsorbent and PEG additive. In particular, FIG. 3A shows the first two cycles of the battery system with and without the AC at a current density of 20 mA cm$^{-2}$, the sample for UV-vis spectrum test being taken at the end of the first charging process.

Remarkable differences in cycling performances of the two battery systems are observed in FIG. 3A. It is noted that the 1$^{st}$-cycle CE of the battery system without the AC (36% at 20 mA cm$^{-2}$) is much lower than the battery system with the AC (72% at 20 mA cm$^{-2}$) and the 2$^{nd}$ cycle of the battery system with the AC maintains a CE of 85%, achieving a discharge capacity that is approximately same as that of the first cycle.

There is a 6.4 Ah L$^{-1}$ difference between the 1$^{st}$ and the 2$^{nd}$ charging capacity, which is not observed in subsequent cycles. The difference may be attributed to the irreversible AC adsorption of iodine in the 1$^{st}$ cycle.

Figure 6A:
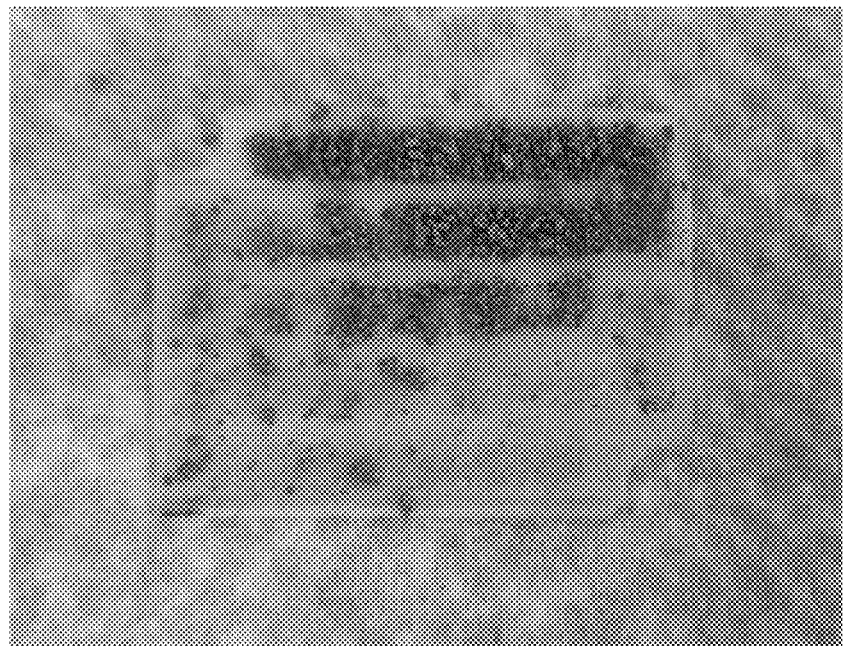
FIG. 6A is an image showing dendrite remained on anode surface of potassium-zinc-iodine flow battery without activated carbon in electrolyte tank (K—C0) after 3 cycles, according to an embodiment of the subject invention.

It is also noted that such CE is achieved with high areal Zn plating capacity over 75 mAh cm$^{-2}$ and long discharging time over 3 hours 45 minutes. In the 2$^{nd}$ cycle, the coulombic efficiency of the battery system without the AC drops to <10%, while the charging voltage also dramatically drops, which may be due to a serious formation of dendrite on the Zn electrode as shown in FIG. 6A.

Figure 3C:
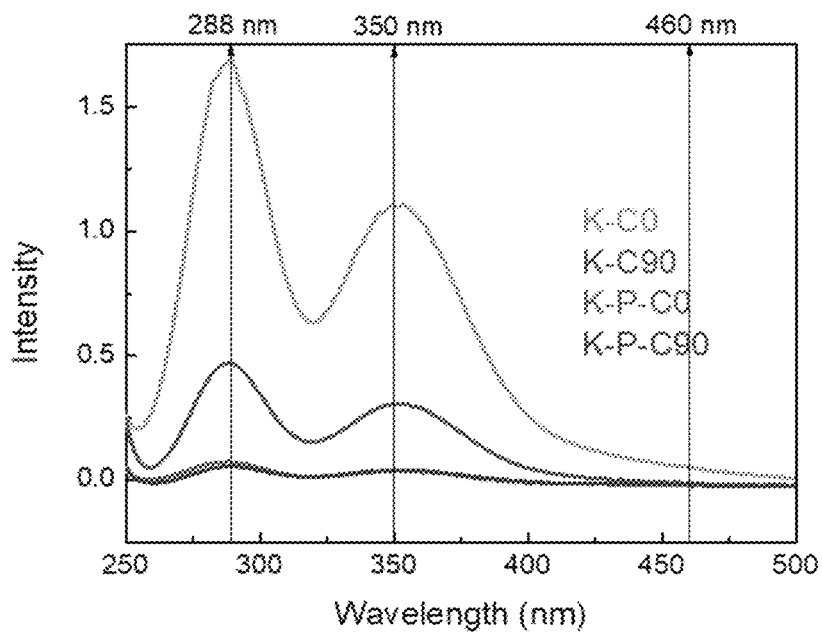

The 1$^{st}$-cycle charging voltage of the battery system without the AC is higher than that of the battery system with the AC, which may be contributed by a higher concentration of $I_3^-/I_2Br^-$ in catholyte. The hypothesis was verified by the UV-vis adsorption test of the fully charged electrolyte shown in FIG. 3C. It is observed that the $I_3^-/I_2Br^-$ adsorption peaks (288 and 350 nm) of the battery system with the AC is much lower than that of the battery system without the AC, which may explain the difference in the coulombic efficiencies of the two battery systems.

Moreover, the adsorption peak of iodine commonly seen in an iodine flow battery is not observed for the battery system with the AC, proving the effectiveness of iodine adsorption by the AC in the container of the battery system. The discharge capacity of the AC is greater than 30 Ah L$^{-1}$, considering both anolyte volume and the catholyte volume. It is noted that the theoretical capacity of iodine in catholyte is only 26.8 Wh L$^{-1}$, indicating that the iodine in the anolyte also contributes to the capacity increase.

Although the AC adsorption significantly improves the performance of Zn—I battery with porous membrane, the low CE, low energy efficiency and dendrite issue still cannot satisfy the requirements of realistic applications. To overcome the challenges, polyethylene glycol (PEG) as additive is introduced to the flow battery system of the subject invention.

Figure 4A:
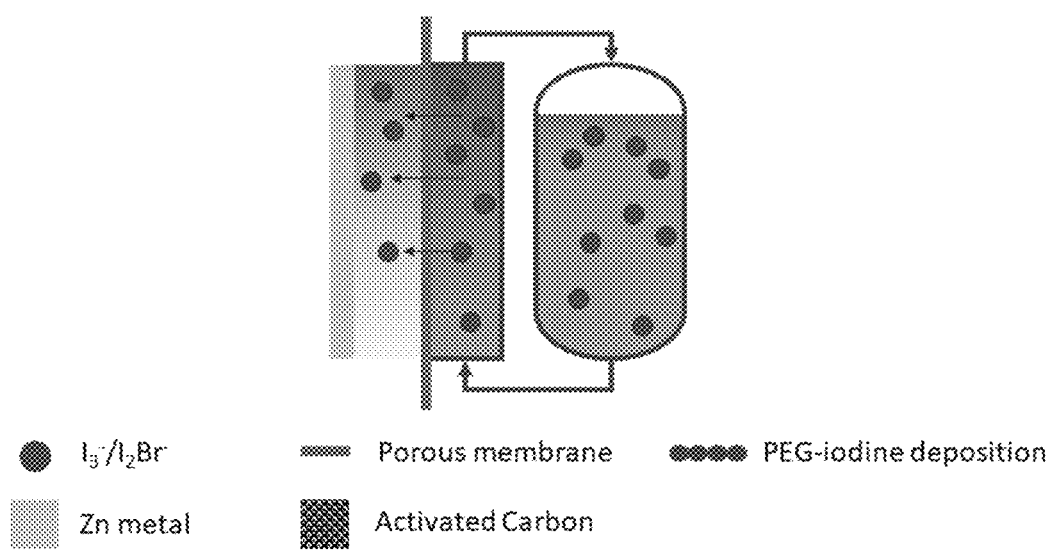
FIGS. 4A-4C show schematic representations of mechanisms of effects of adsorbent and PEG additive on $I^{3-}/I_2Br^-$ crossover.
Figure 4B:
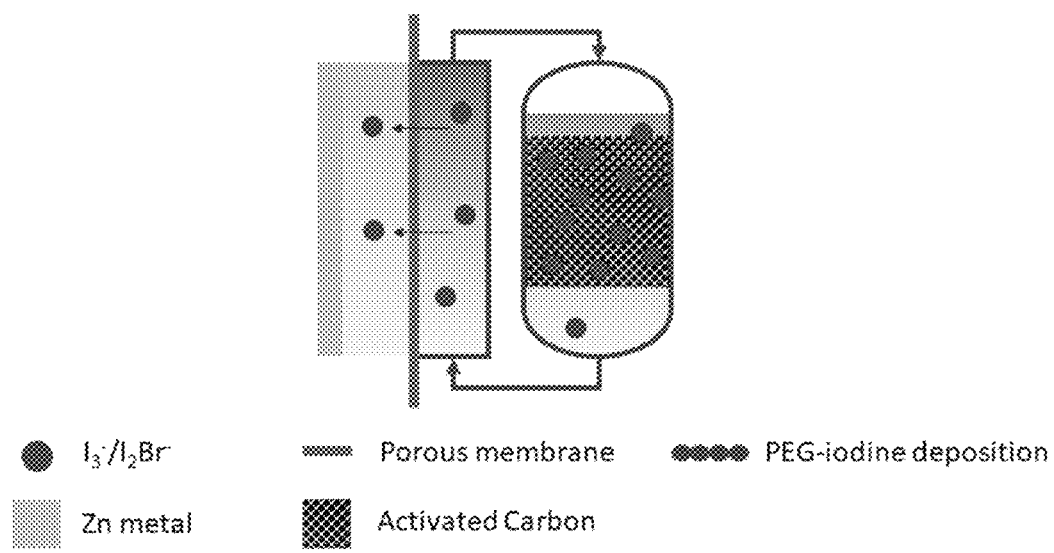
Figure 4C:
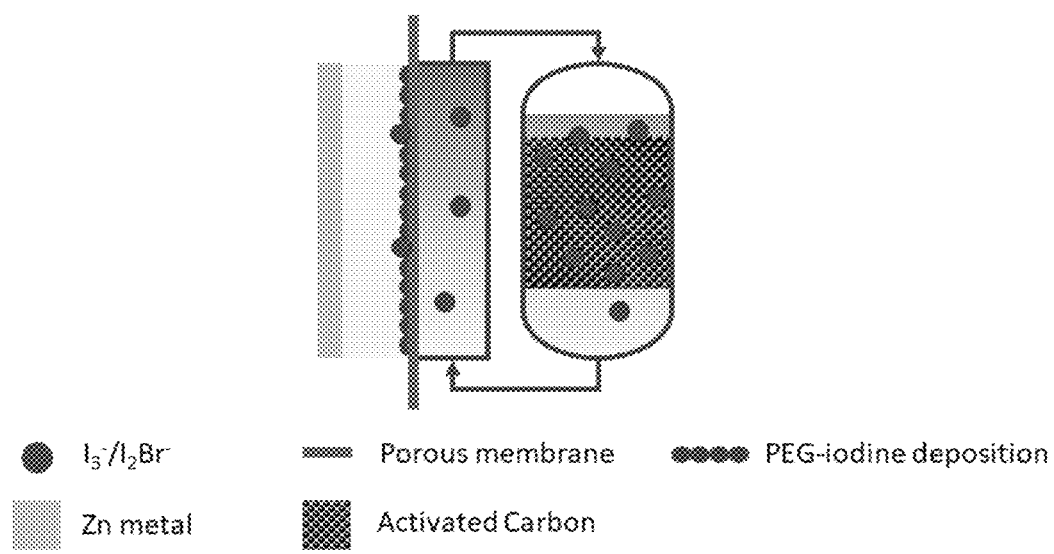

It is well known that PEG as electrolyte additive can suppress Zn dendrite formation and hydrogen evolution, which is commonly used in Zn plating and Zn flow batteries [6-8]. However, in the Zn—I flow batteries, PEG forms complex with $I_3^-$ at high SOC and the complex is an insoluble dark semisolid precipitation blocking ionic tunnels in the microporous separator, causing resistance increase for ionic transfer. The AC adsorbent in the tank limits the concentration of $I_3^-/I_2Br^-$ in electrolyte, which controls the thickness of PEG-I complex deposition. The mechanism of PEG additive in adsorption-aided Zn—I flow battery is shown in FIG. 4C. High coulombic efficiency and high capacity can be achieved with the AC in tank and the PEG additive.

Figure 6B:
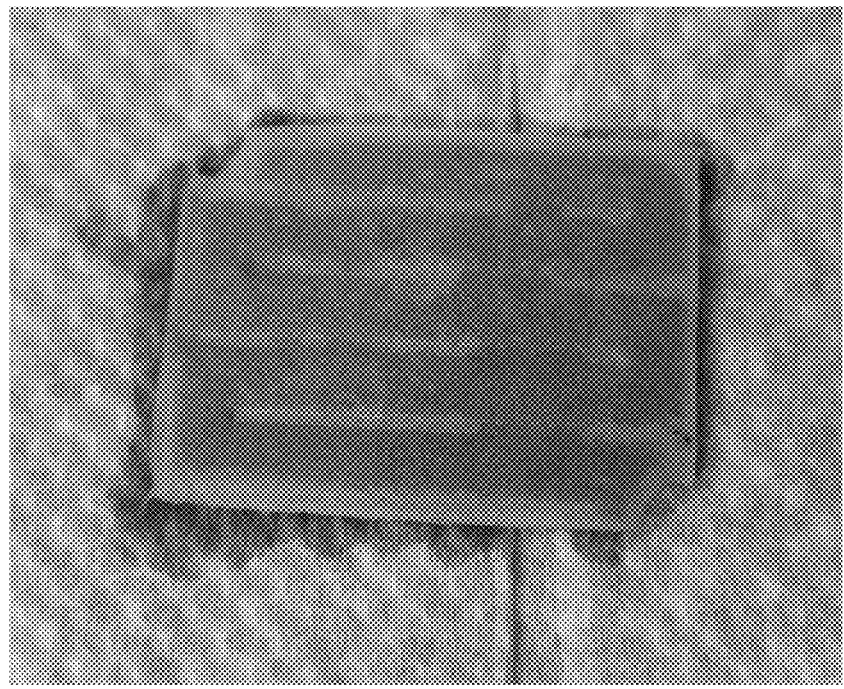
FIG. 6B is an image showing a surface of anode of a potassium-zinc-iodine flow battery with activated carbon in the electrolyte tank (A-PEG-C0) after 3 cycles, according to an embodiment of the subject invention.
Figure 6C:
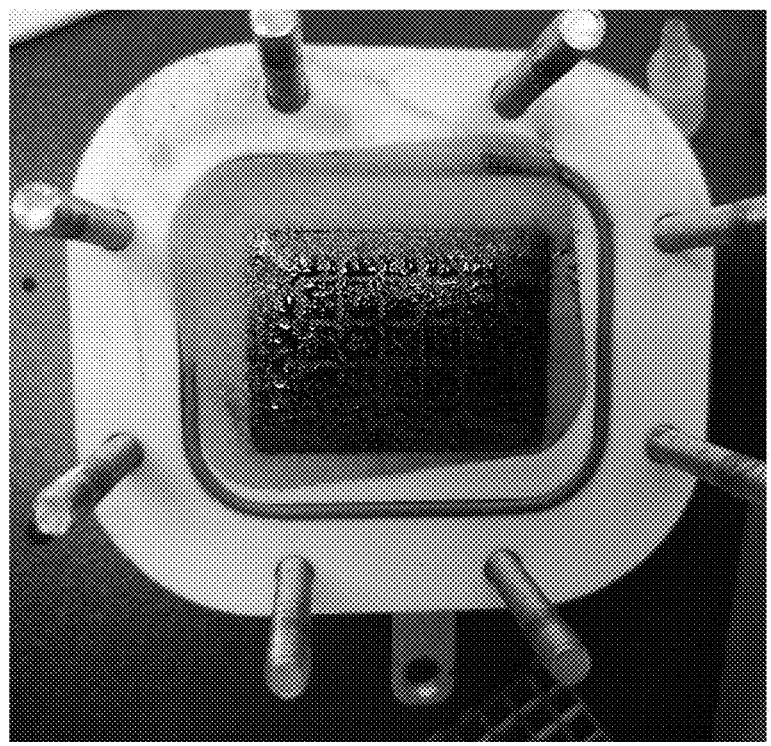
FIG. 6C is an image showing PEG-I precipitation on a porous separator of a sample of ammonium-zinc-iodine flow battery with PEG additive and without activated carbon in electrolyte tank (A-PEG-C0), according to an embodiment of the subject invention.

As shown in FIG. 3B, the electrolyte with 1M $ZnI_2$ and 1% vol PEG$_{400}$ can only discharge with a volumetric capacity of 5 Ah L$^{-1}$, which is about 18.7% of the theoretical capacity at low cell voltage of 0.6V. The charging reaction stops at 6.5 Ah L$^{-1}$, being shut down by high polarization. As shown in FIG. 6C, black viscous slurry is observed on anode-side separator of the disassembled flow cell, which is an evidence of PEG-I complex formation.

The separator-blocking problem by PEG can be solved by the AC adsorption of the subject invention. In one embodiment, the AC is added into the catholyte tank of the flow cell with 1% vol PEG$_{400}$ (weighting 90% of iodine in catholyte). As shown in FIG. 3B, the first discharge shows a volumetric capacity of 18.3 Ah L$^{-1}$ and CE of 62.5%. With the AC in tank, the discharge voltage of the flow cell recovers from 0.6V to 1.01V, as a result of dissolution of PEG-I complex. The second cycle shows volumetric capacity of 27.5 Ah L$^{-1}$ and CE of 90.8%. The discharge voltage is further improved to 1.08V. Moreover, shown in FIG. 6B, zinc dendrite formation in the flow cell with AC and PEG is suppressed significantly, which indicates uniform zinc plating during charging. The embodiment shows significant effect of AC and PEG on cross-over and zinc plating morphology in Zn—I flow batteries.

Figure 5A:
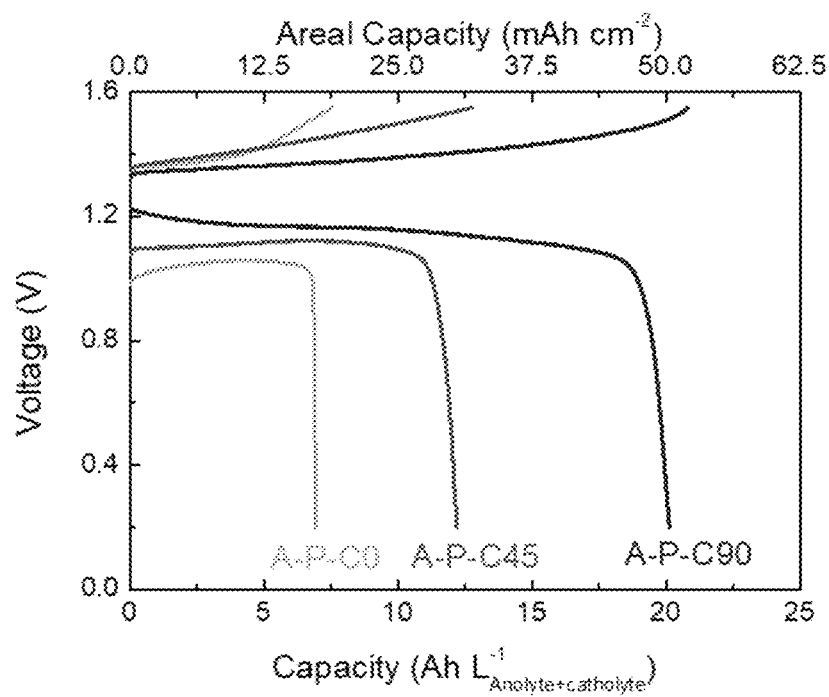

In one embodiment, referring to FIG. 5A, with the AC weighting 45% of the iodine, the volumetric capacity is increased to 12.2 Ah L$^{-1}$ (30.5 mAh cm$^{-2}$). In another embodiment, the AC weighting 90% of the iodine is added into the catholyte tank, achieving volumetric capacity of 20.1 Wh L$^{-1}$ (50.3 mAh cm$^{-2}$). The AC adsorption limits concentration of $I_3^-/I_2Br^-$ in the electrolyte, leading to a reduction of PEG-I complex precipitation on the separator.

Figure 5B:
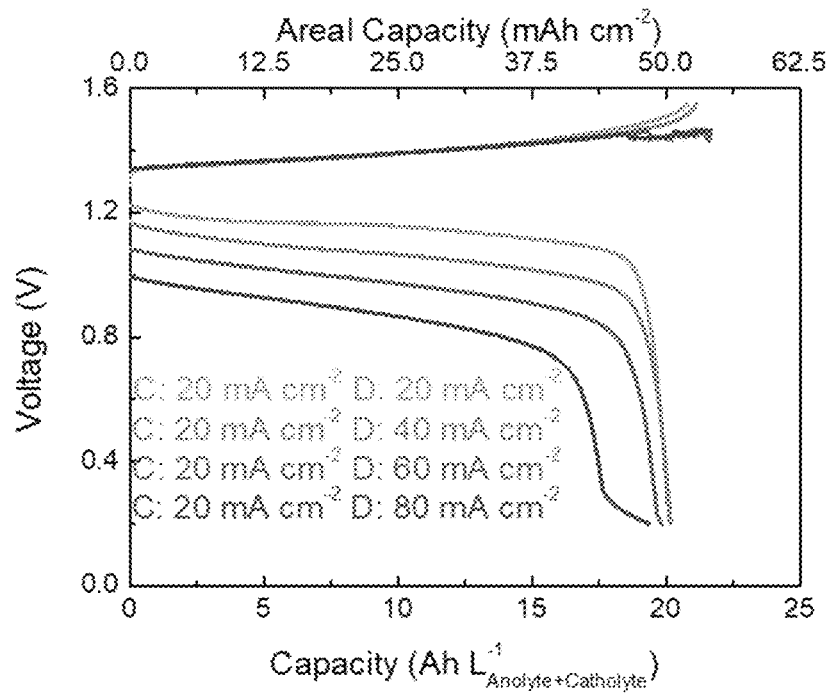

At high SOC, PEG-I complex formed in the catholyte container may fix more free-$I_3^-/I_2Br^-$ on surfaces of the AC, further suppressing the crossover issue. A CE greater than 95% can be achieved for current densities in a range of 20-40 mA cm$^{-2}$ as shown in FIG. 5B.

Figure 5C:
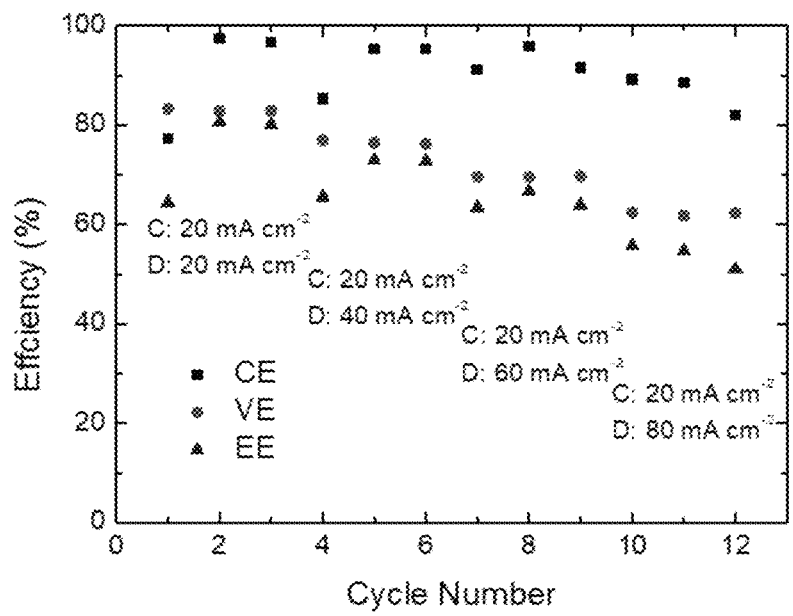
Figure 5D:
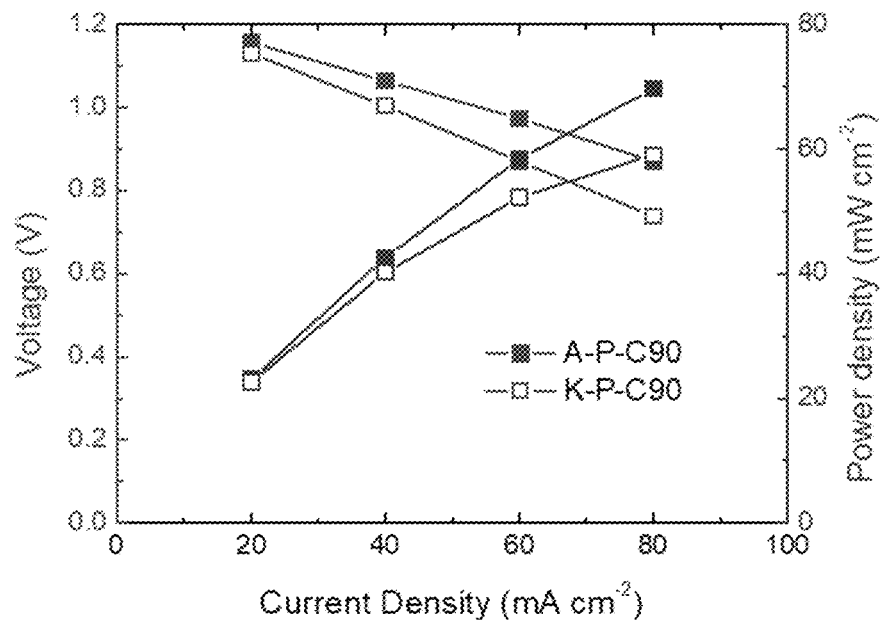
Figure 6D:
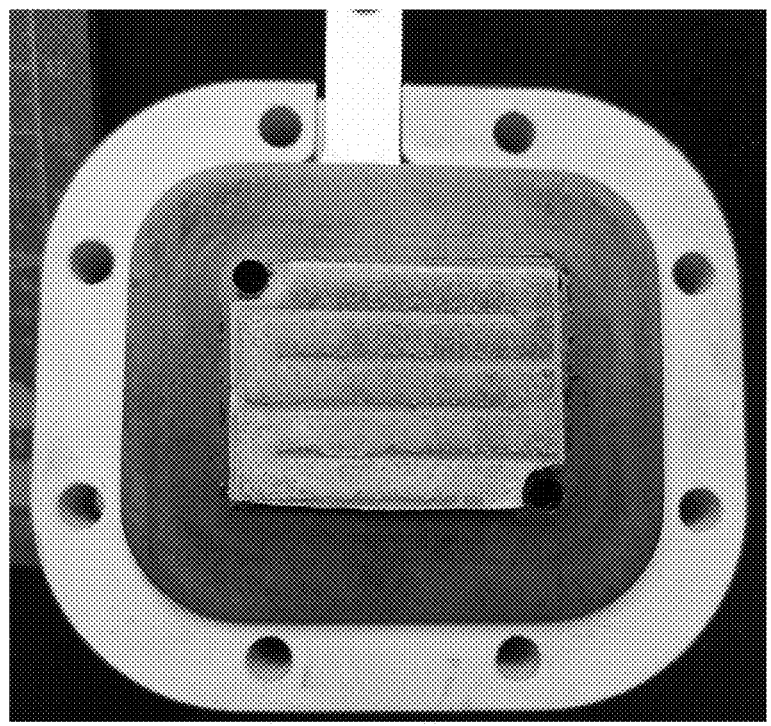
FIG. 6D is an image showing a surface of ammonium-zinc-iodine flow battery with PEG additive and with activated carbon in electrolyte tank (A-PEG-C90) after 3 cycles, according to an embodiment of the subject invention.
Figure 7:
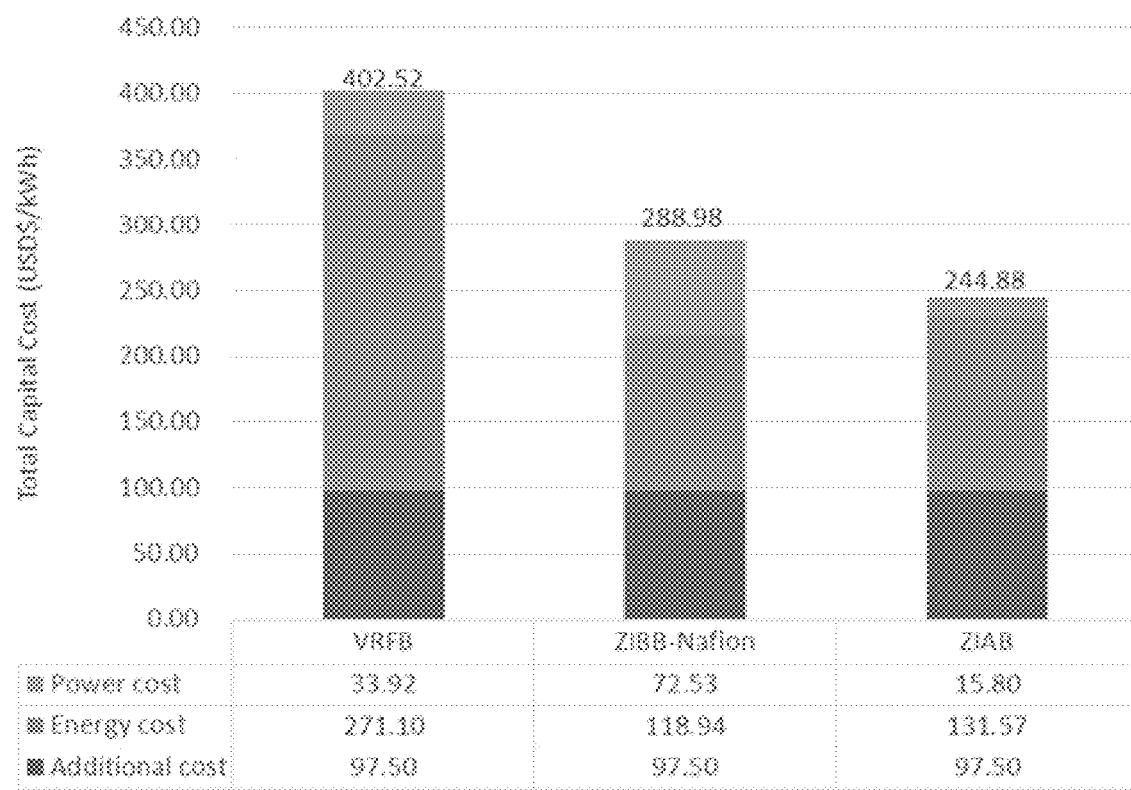
FIG. 7 shows comparison of cost break-down for a 2-h energy storage system having a vanadium redox flow battery (VRFB), a conventional Zn—I—Br flow battery with a Nafion separator such as a zinc/iodine-bromide battery (ZIBB) with Nafion, and a Zn—I Adsorption-aided flow battery (ZIAB), according to an embodiment of the subject invention.

In one embodiment, to further improve rate performance of the flow battery system, ammonium bromide (NH$_4$Br), instead of KBr, may be adopted as supporting electrolyte for its better ionic conductivity. The voltage efficiency of the flow battery system drops from 82.9% to 62.3%, when the current density increases from 20 mA cm$^{-2}$ to 80 mA cm$^{-2}$ as shown in FIG. 5C, while the discharge power density is increased from 23.1 mA cm$^{-2}$ to 69.7 mWh cm$^{-2}$ as shown in FIG. 5D. With the PEG in anolyte, the formation of dendrite is also suppressed, which is observed on the surfaces of the Zn electrode at the end of the cycling as shown in FIG. 6D. By using the AC adsorption and having PEG as an additive, the Zn—I flow battery system having a low-cost porous separator can achieve a high energy efficiency and a high power density. The flow battery system of the subject invention reduces the crossover of active materials and allows the usage of a membrane separator that is 10 times cheaper than the conventional membrane separator.

To evaluate the economic impacts of the adsorption-aided flow battery system, a cost model described by R. M. Darling et al.[9], with mineral price information published by the U. S. Geological Survey (USGC) is utilized. The calculation is based on the assumption of building a 2-h energy storage system, which is a favored configuration for energy storage application for solar power and wind farms. The estimated costs of battery component are listed in Table 2.

TABLE 2

Estimated Battery Components Cost and Performance

| | Unit | VRFB | ZIBB-Nafion | ZIAB |
|---|---|---|---|---|
| Faraday Constant | Ah M$^{-1}$ | 26.80 | 26.80 | 26.80 |
| Discharge Time | H | 2 | 2 | 2 |
| OCV | V | 1.4 | 1.354 | 1.354 |
| Number of Electrons | | 1 | 2 | 2 |
| Additional Cost | $ kW$^{-1}$ | 50 | 50 | 50 |
| BOP Cost | $ kW$^{-1}$ | 145 | 145 | 145 |

TABLE 2-continued

Estimated Battery Components Cost and Performance

|  | Unit | VRFB | ZIBB-Nafion | ZIAB |
|---|---|---|---|---|
| Separator Area Cost | $ m$^{-2}$ | 225 | 225 | 49 |
| Resistance | mΩ m$^2$ | 0.05 | 0.1 | 0.1 |
| Areal Cost Factor | $ mΩ | 11.25 | 22.5 | 4.901961 |
| Positive material cost | $ kg$^{-1}$ | 64.47 | 22.46 | 23.86 |
| Negative material cost | $ kg$^{-1}$ | 64.47 | 0.258 | 0.258 |
| Electrolyte Cost | $ kg$^{-1}$ | 0.1 | 0.1 | 0.1 |
| Active material:Electrolyte mass ratio |  | 0.1 | 0.66 | 0.66 |
| Positive molecular weight | g M$^{-1}$ | 51 | 254 | 254 |
| Negative molecular weight | g M$^{-1}$ | 51 | 66 | 66 |
| Positive DOD | % | 0.8 | 0.8 | 0.8 |
| Negative DOD | % | 0.8 | 0.53 | 0.53 |
| System efficiency | % | 0.94 | 0.94 | 0.94 |
| Voltage efficiency | % | 0.9 | 0.9 | 0.9 |
| Coulombic efficiency | % | 0.97 | 0.99 | 0.95 |

FIG. 6 shows comparison of cost break-down for a 2-h energy storage system having a vanadium redox flow battery (VRFB), a conventional Zn—I—Br flow battery with a Nafion separator (ZIBB-Nafion), and a Zn—I Adsorption-aided flow battery (ZIAB), respectively. It is found that compared to the vanadium flow battery, the Zn—I batteries can significantly reduce system cost due to the benefits of low-cost active material. With a low-cost separator, the ZIAB further reduces power costs to almost one fifth of the conventional Zn—I flow battery with Nafion.

Although the energy cost is increased by 10.6% due to the extra cost of the activated carbon adsorbent, the system cost of the Zn—I flow battery with the adsorption-aided design is decreased by 15.3%, showing the economic competitiveness of the system and methods of the subject invention.

Materials

ZnI$_2$ (Aladdin Chemical Reagent Co. Ltd., 98%), ZnBr2 (Xinbao Fine Chemical Factory, 98%), KI (Aladdin Chemical Reagent Co. Ltd., 99%), NH$_4$Br (Aladdin Chemical Reagent Co. Ltd., 99%), Activated carbon by wood (Fuzhou Y H-Carbon Co. Ltd., #8-25, I value 950-1000), PEG (Aladdin Chemical Reagent Co. Ltd., Mn 400), PTFE porous separator (Haining Yibo Filter Co. Ltd., pore size 0.1 µm hydrophilic), Polymer nonwoven cloth (Mitsubishi Paper Mills Co. Ltd., 150 µm), Zn plate (Hebei Shengshida Metal Co. Ltd., 0.1 mm), and copper foam (Shanghai Yinfu Metal Co. Ltd., 2 mm) are used as received. Carbon felt (Beijing Jinglong Te Tan Co. Ltd., 3 mm) was heated in air at 500° C. for 5 hours. All the electrolytes are prepared with deionized water.

Flow Battery Assembly

A schematic representation of the flow stack internal structure of the flow cell is shown in FIG. 2C. The zinc plate, copper foam electrode and carbon felt electrode contacts graphite plate current collector by compression. The graphite plate on anode side is flat and the cathode side has a serpentine flow channel. There is a gap of 2.5 mm between the separator and anode, supported by a serpentine flow channel frame made by fused deposition modeling (FDM) three-dimensional (3D) printing. The effective area of the stack is measured to be 3×4 cm$^2$. A 4.5 mm gasket is use at the anode side and a 2 mm gasket is used at the cathode side. The PTFE gasket is fabricated by Shenzhen Sogaa Technology Co. Ltd., and the graphite plate is fabricated by Beijing Jinglong Te Tan Co. Ltd. The catholyte tank is modified from a sand-core funnel (Shanghai Leigu Glass Co. Ltd., 35 mL), assembled with top-half of a polypropylene bottle by silica gel. The electrolyte circulates between tank and stack by peristatic pumps (Beijin LHZW Technology Co. Ltd.). Each test uses 15 mL catholyte and 15 mL anolyte.

Electrochemical Tests

The battery testing station is a model CT3001A supplied by Wuhan Lanhe Technology Co. Ltd. For the test of electrolyte sample K—C0 in FIG. 3A, the charging process is cut by capacity at 960 mAh or voltage at 1.55 V. For the test of K-C90 in FIG. 3B, the charging process is cut by capacity at 1200 mAh or voltage at 1.55 V. For the test of A-P-CO, A-P-C45, and A-P-C90 in FIGS. 4A and 4B, the charging process cuts by capacity at 650 mAh or voltage at 1.55 V.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Li, B., et al., *Ambipolar zinc-polyiodide electrolyte for a high-energy density aqueous redox flow battery*. Nature Communications, 2015. 6.
2. Xie, C. X., et al., *A Long Cycle Life, Self-Healing Zinc-Iodine Flow Battery with High Power Density*. Angewandte Chemie-International Edition, 2018. 57(35): p. 11171-11176.
3. Weng, G. M., et al., *Unlocking the capacity of iodide for high-energy-density zinc/polyiodide and lithium/polyiodide redox flow batteries*. Energy & Environmental Science, 2017. 10(3): p. 735-741.
4. Pan, H., et al., *Controlling solid-liquid conversion reactions for a highly reversible aqueous zinc-iodine battery*. ACS Energy Letters, 2017. 2(12): p. 2674-2680.
5. Xie, C., et al., *Highly stable zinc-iodine single flow batteries with super high energy density for stationary energy storage*. Energy & Environmental Science, 2019. 12(6): p. 1834-1839.
6. Ballesteros, J., et al., *Zinc electrodeposition in the presence of polyethylene glycol 20000*. Electrochimica Acta, 2007. 52(11): p. 3686-3696.
7. Kim, J.-W., J.-Y. Lee, and S.-M. Park, *Effects of organic additives on zinc electrodeposition at iron electrodes studied by EQCM and in situ STM*. Langmuir, 2004. 20(2): p. 459-466.
8. Sun, K. E., et al., *Suppression of dendrite formation and corrosion on zinc anode of secondary aqueous batteries*. ACS applied materials & interfaces, 2017. 9(11): p. 9681-9687.
9. Darling, R. M., et al., *Pathways to low-cost electrochemical energy storage: a comparison of aqueous and non-aqueous flow batteries*. Energy & Environmental Science, 2014. 7(11): p. 3459-3477.

We claim:

1. A flow battery system, comprising:
   an anolyte comprising a first active material having a charged state $A_c$ and a discharged state $A_d$; a catholyte comprising a second active material having a charged state $B_c$ and discharged state $B_d$;
   an anode configured to be in contact with the anolyte;
   a cathode configured to be in contact with the catholyte;
   a separator interposed between the anode and the cathode; and
   a plurality of solid adsorbents with a specific surface area larger than 20 m$^2$ g$^{-1}$.

2. The flow battery system of claim 1, wherein the plurality of solid adsorbents is disposed in one or both of the anolyte and the catholyte, and wherein during charging, the charged active material $A_c$ and/or $B_c$ is adsorbed on surfaces of the adsorbents and stored in the anolyte and/or the catholyte, and during discharging, $A_c$ and/or $B_c$ is desorbed from surfaces of the adsorbents to the anolyte and/or the catholyte, and the discharged active material $A_d$ and/or $B_d$ is dissolved in the anolyte and/or the catholyte.

3. The flow battery system of claim 2, wherein the anolyte or catholyte is disposed in a tank having a filter structure to keep the solid adsorbents within the tank.

4. The flow battery system of claim 3, wherein the adsorbent comprises activated carbon in a form of a particle, a pellet, fabric, or porous bulk.

5. The flow battery system of claim 3, wherein the adsorbent comprises silica gel in a form of a particle, a pellet, fabric, or porous bulk.

6. The flow battery system of claim 3, wherein the adsorbent comprises zeolite in a form of a particle, a pellet, fabric, or porous bulk.

7. The flow battery system of claim 3, wherein the adsorbent comprises polymer matrix in a form of a particle, a pellet, fabric, or porous bulk.

8. The flow battery system of claim 3, wherein the adsorbent comprises transition metal oxides and sulfides including any of Sc, Ti, V, Cr, Mn, Fe, Co, Ni, Cu, and Zn, in a form of a particle, a pellet, fabric, or porous bulk.

9. The flow battery system of claim 3, wherein the adsorbent comprises metal-organic frameworks (MOF) in a form of a particle, a pellet, fabric, or porous bulk.

10. The flow battery system of claim 3, wherein the cathode active material comprises halogen including any of Cl/Cl$^-$, Br/Br$^-$, and I/I$^-$.

11. The flow battery system of claim 10, wherein the anolyte and catholyte each comprises zinc iodide.

12. The flow battery system of claim 11, wherein the anolyte and catholyte each comprises supporting cations including any of Li$^+$, Na$^+$, K$^+$, and NH$_4^+$.

13. The flow battery system of claim 12, wherein the anolyte and/or the catholyte comprises a polyethylene glycol (PEG) additive.

14. The flow battery system of claim 3, wherein the cathode active material comprises metal ions including any of V$^{4+}$/V$^{5+}$, Mn$^{2+}$/Mn$^{3+}$, Fe$^{2+}$/Fe$^{3+}$, Co$^{2+}$/Co$^{3+}$, and Ce$^{3+}$/Ce$^{4+}$.

15. The flow battery system of claim 3, wherein the cathode active material comprises organic molecules including any of 2,5-di-tert-butyl-1,4-bis(2-methoxyethoxy)benzene, 4-hydrocy-TEMPO, and ferrocene derivatives.

16. The flow battery system of claim 3, wherein the anode active material comprises sulfide/polysulfide.

17. The flow battery system of claim 3, wherein the anode active material comprises transition metal ions including any of Ti$^{3+}$/Ti$^{4+}$, V$^{2+}$/V$^{3+}$ and Cr$^{2+}$/Cr$^{3+}$.

18. The flow battery system of claim 3, wherein the cathode active material comprises organic molecules including anthraquinone and methylviologen.

19. The flow battery system of claim 3, wherein the separator is a micro-porous membrane.

20. The flow battery system of claim 3, wherein the separator is an anion/cation exchange membrane.

* * * * *